(12) United States Patent
Ogawa et al.

(10) Patent No.: US 6,638,197 B2
(45) Date of Patent: Oct. 28, 2003

(54) TWIN CLUTCH TRANSMISSION WITH GEAR HIT NOISE SUPPRESSION SYSTEM

(75) Inventors: Soichiro Ogawa, Kanagawa (JP); Hidetoshi Shigyo, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/158,161

(22) Filed: May 31, 2002

(65) Prior Publication Data

US 2002/0183162 A1 Dec. 5, 2002

(30) Foreign Application Priority Data

Jun. 1, 2001 (JP) .......................................... 2001-166194

(51) Int. Cl.⁷ .............................................. B60K 41/02
(52) U.S. Cl. .......................... 477/174; 477/905; 74/330
(58) Field of Search ................. 74/330, 337; 477/174, 477/905

(56) References Cited

U.S. PATENT DOCUMENTS

| | | | | |
|---|---|---|---|---|
| 5,881,600 A | * | 3/1999 | Fan | 74/329 |
| 5,915,512 A | | 6/1999 | Adamis et al. | |
| 6,009,768 A | | 1/2000 | Hoshiya et al. | |

FOREIGN PATENT DOCUMENTS

| | | |
|---|---|---|
| JP | 8-320054 | 12/1996 |
| JP | 9-196164 | 7/1997 |
| JP | 10-89457 | 4/1998 |
| JP | 11-37260 | 2/1999 |
| JP | 11-82727 | 3/1999 |
| JP | 11-82729 | 3/1999 |
| JP | 11-201271 | 7/1999 |
| JP | 2001-295898 | 10/2001 |

* cited by examiner

*Primary Examiner*—Dirk Wright
(74) *Attorney, Agent, or Firm*—Foley & Lardner

(57) ABSTRACT

A control unit is provided for controlling a twin clutch mechanism which includes first and second automatic clutches respectively incorporated with first and second groups of gears. The control unit is configured to carry out establishing a condition wherein both the first and second automatic clutches are in their engaged conditions and wherein one of the first and second groups of gears is operated to select a certain speed gearing with the aid of a corresponding selection mechanism while leaving the other of the first and second groups of gears in a neutral condition with the aid of the other corresponding selection mechanism; and releasing the engaged condition of the automatic clutch incorporated with the other of the first and second groups of gears when the other of the first and second groups of gears is in a critical condition to induce a gear hit noise.

11 Claims, 3 Drawing Sheets

FIG.2

| | Automatic Clutch | | 1st Drum for Odd Speed Gearings | | | | | | | 2nd Drum for Even Speed Gearings | | | | |
|---|---|---|---|---|---|---|---|---|---|---|---|---|---|---|
| | | | 1st/3rd Speed Coupling Sleeve (23) | | | 5th Speed Coupling Sleeve (26) | | Reverse Idler Gear (27) | | 2nd Speed Coupling Sleeve (24) | | 4th/6th Speed Coupling Sleeve (25) | | |
| | C1 | C2 | 1st Speed Position | Neutral Position | 3rd Speed Position | 5th Speed Position | Neutral Position | Reverse Position | Neutral Position | 2nd Speed Position | Neutral Position | 4th Speed Position | Neutral Position | 6th Speed Position |
| Reverse Gearing | ○ | | | ○ | | | ○ | ○ | | | ○ | | ○ | |
| First Speed Gearing | ○ | | ○ | | | | ○ | | ○ | | ○ | | ○ | |
| Second Speed Gearing | | ○ | | ○ | | | ○ | | ○ | ○ | | | ○ | |
| Third Speed Gearing | ○ | | | | ○ | | ○ | | ○ | | ○ | | ○ | |
| Fourth Speed Gearing | | ○ | | ○ | | | ○ | | ○ | | ○ | ○ | | |
| Fifth Speed Gearing | ○ | | | ○ | | ○ | | | ○ | | ○ | | ○ | |
| Sixth Speed Gearing | | ○ | | ○ | | | ○ | | ○ | | ○ | | | ○ |

TWIN CLUTCH TRANSMISSION WITH GEAR HIT NOISE SUPPRESSION SYSTEM

BACKGROUND OF INVENTION

1. Field of Invention

The present invention relates in general to a twin clutch transmission in which speed gearings are parted into two groups which are selectively operated by respective automatic clutches, and more particularly to a gear hit noise suppression system for use in such twin clutch transmission.

2. Description of Related Art

Hitherto, various types of twin clutch transmissions have been proposed and put into practical use particularly in the field of wheeled motor vehicles. As is known, the twin clutch transmissions are of a type in which gears are parted into two groups each having an automatic clutch, so that operative condition of each group of gears is carried out by selectively engaging the corresponding automatic clutch. Some of the transmissions of this type are disclosed in Laid-Open Japanese Patent Applications 8-320054, 9-196164, 10-89457, 11-37260, 11-82729, 11-201271 and 2001-295898.

However, due to inherent constructions, the transmissions of these publications have failed to sufficiently suppress or damp gear noises produced by the gears used in the transmission. Particularly, in the transmission of the publication 8-320054, there is employed an arrangement in which when one group of gears actually work for power transmission having the corresponding clutch engaged, the other group of gears are caused to assume a neutral condition having the corresponding clutch kept engaged. In this arrangement, even in the neutral condition, the gears of the other group are forced to input the engine rotation because of the engaged condition of the corresponding clutch. Accordingly, when the input section of the transmission undergoes a speed change, a so-called gear hit noise is produced due to a back rush phenomenon that is inevitably produced by mutually engaged gears of the other group in a rest condition.

SUMMARY OF INVENTION

It is therefore an object of the present invention to provide a twin clutch transmission which is suppressed from producing a gear hit noise which would be caused by back rush phenomenon of the gears of one group that is in a rest condition.

According to a first aspect of the present invention, there is provided a twin clutch transmission for use with a prime mover, which comprises a first group of gears which are operable to select one of a first group of speed gearings with the aid of a first selection mechanism; a second group of gears which are operable to select one of a second group of speed gearings with the aid of a second selection mechanism; a first automatic clutch which is incorporated with the first group of gears to establish the selected one of the first group of gearings when engaged; a second automatic clutch which is incorporated with the second group of gears to establish the selected one of the second group of gearings when engaged; and a control unit which controls the first and second selection mechanisms and the first and second automatic clutches, the control unit being configured to carry out establishing a condition wherein both the first and second automatic clutches are in their engaged conditions and wherein one of the first and second groups of gears is operated to select a certain speed gearing with the aid of the corresponding selection mechanism while leaving the other of the first and second groups of gears in a neutral condition with the aid of the corresponding selection mechanism; and releasing the engaged condition of the automatic clutch incorporated with the other of the first and second groups of gears when the other of the first and second groups of gears is in a critical condition to induce a gear hit noise.

According to a second aspect of the present invention, there is provided a method of controlling a twin clutch transmission for use with a prime mover, the transmission including a first group of gears which are operable to select one of a first group of speed gearings with the aid of a first selection mechanism; a second group of gears which are operable to select one of a second group of speed gearings with the aid of a second selection mechanism; a first automatic clutch which is incorporated with the first group of gears to establish the selected one of the first group of gearings when engaged; and a second automatic clutch which is incorporated with the second group of gears to establish the selected one of the second group of gearings when engaged, the method comprising establishing a condition wherein both the first and second automatic clutches are in their engaged conditions and wherein one of the first and second groups of gears is operated to select a certain speed gearing with the aid of the corresponding selection mechanism while leaving the other of the first and second groups of gears in a neutral condition with the aid of the corresponding selection mechanism; and releasing the engaged condition of the automatic clutch incorporated with the other of the first and second groups of gears when the other of the first and second groups of gears is in a critical condition to induce a gear hit noise.

BRIEF DESCRIPTION OF DRAWINGS

FIG. 2 is a table showing a logic of speed gearing change established by the twin clutch transmission of the present invention.

DETAILED DESCRIPTION OF INVENTION

Figure 1:
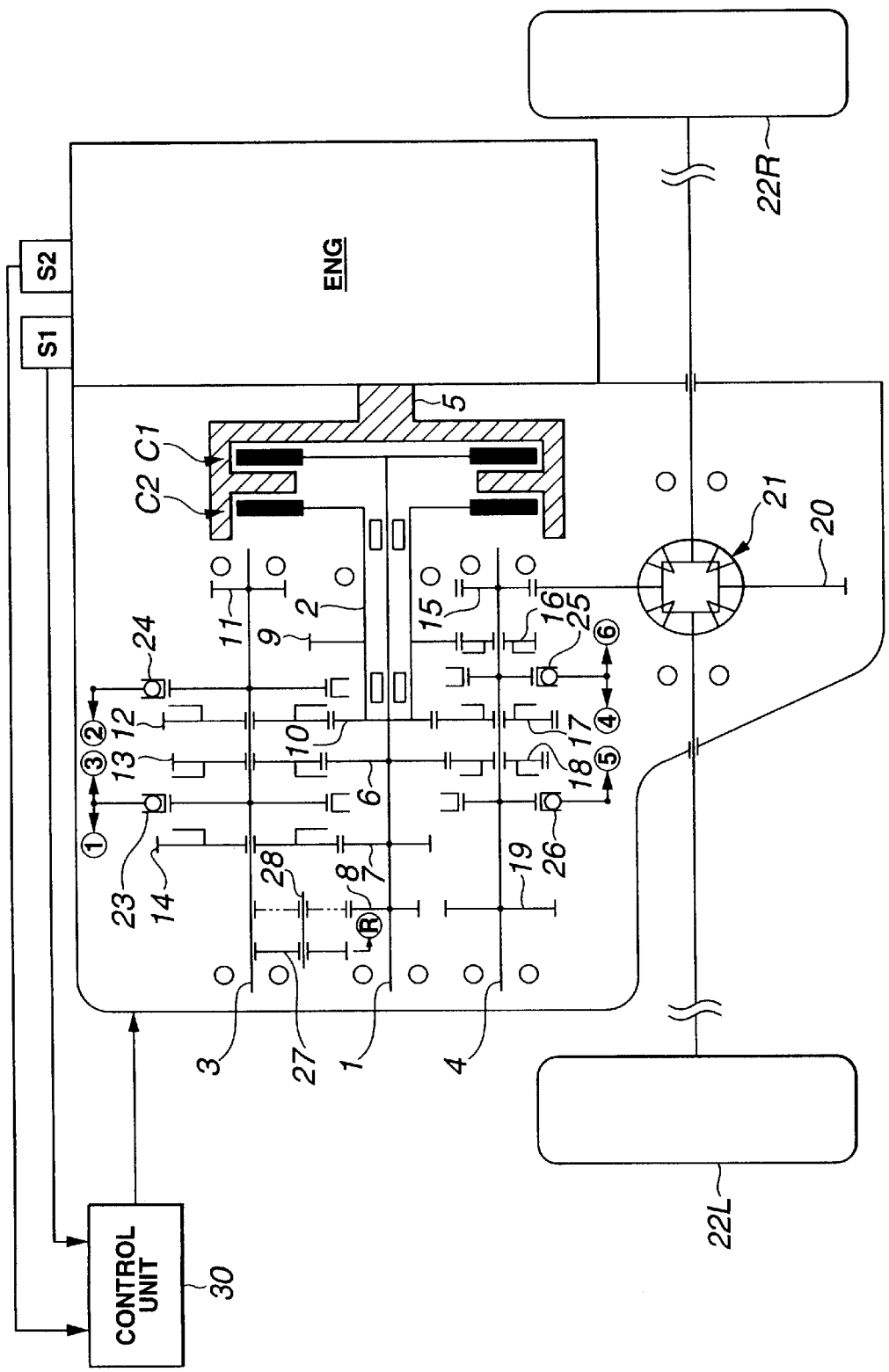
FIG. 1 is a schematic illustration of a twin clutch transmission with a gear hit noise suppression system, according to the present invention.

Referring to the drawings, especially FIG. 1, there is shown a twin clutch transmission 100 according to the present invention, which is equipped with a gear hit noise suppression system.

The twin clutch transmission 100 illustrated is of an automatic clutch type and constitutes a transaxle of a front drive motor vehicle, which comprises a first input shaft 1, a hollow second input shaft 2 which is coaxially disposed about the first input shaft 1 to achieve a relative rotation therebetween, first and second main shafts 3 and 4 which extend in parallel with the first and second input shafts 1 and 2, and a plurality of gears which are arranged on and/or around shafts 1, 2, 3 and 4 in an after-mentioned manner.

Although all of shafts 1, 2, 3 and 4 are illustrated to be mounted on a common plane in FIG. 1, actually these shafts 1, 2, 3 and 4 are arranged on different planes so as to constitute an after-mentioned gear transmission mechanism.

The first input shaft 1 is connectable to a crankshaft 5 of an internal combustion engine "ENG" through a first automatic clutch C1 which is used for establishing an odd speed gearing (viz., first speed gearing, third speed gearing, fifth speed gearing or reverse gearing), while the second input shaft 2 is connectable to the engine crankshaft 5 through a second automatic clutch C2 which is used for establishing an even speed gearing (viz., second speed gearing, fourth speed gearing or sixth speed gearing).

First and second automatic clutches C1 and C2 are of a normally ON type which assumes ON (viz., engaged) state due to a biasing force of a spring or the like under a normal condition and establishes OFF (viz., disengaged) state due to work of a hydraulic or electric actuator upon receiving a given instruction.

To first input shaft 1, there are integrally connected a 3rd/5th speed input gear 6, a 1st speed input gear 7 and a reverse input gear 8 in order of the shorter distance from first automatic clutch C1. The three gears 6, 7 and 8 thus rotate together with first input shaft 1.

To second input shaft 2, there are integrally connected a 6th speed input gear 9 and a 2nd/4th speed input gear 10 in order of the shorter distance from second automatic clutch C2. The two gears 9 and 10 thus rotate together with second input shaft 2.

To first main shaft 3, there is integrally connected a first final drive pinion 11 at a position near first and second automatic clutches C1 and C2, and thus pinion 11 rotates together with first main shaft 3. Furthermore, to first main shaft 3, there are rotatably connected a 2nd speed output gear 12, a 3rd speed output gear 13 and a 1st speed output gear 14 in order of the shorter distance from first and second automatic clutches C1 and C2. The three output gears 12, 13 and 14 thus rotate around first main shaft 3.

To second main shaft 4, there are integrally connected a second final drive pinion 15 and a reverse output gear 19 in order of the shorter distance from first and second automatic clutches C1 and C2, and thus pinion 15 and gear 19 rotate together with second main shaft 4. Furthermore, to second main shaft 4, there are rotatably connected a 6th speed output gear 16, a 4th speed output gear 17 and a 5th speed output gear 18 in order of the shorter distance from first and second automatic clutches C1 and C2. The three output gears 16, 17 and 18 thus rotate around second main shaft 4.

First final drive pinion 11 and second final drive pinion 15 are arranged in a common surface perpendicular to an axis of a final drive ring gear 20 and respectively meshed with gear 20. A transmission output rotation from first or second drive pinion 11 or 15 to final drive ring gear 20 is distributed to left and right front wheels 22L and 22R by a differential gear 21 thereby to run an associated motor vehicle.

2nd speed output gear 12 and 4th speed output gear 17 are meshed with 2nd/4th speed input gear 10, and 3rd speed output gear 13 and 5th speed output gear 18 are meshed with 3rd/5th speed input gear 6. 1st speed output gear 14 is meshed with 1st speed input gear 7, and 6th speed output gear 16 is meshed with 6th speed input gear 9.

In the following, description will be directed to power transmission paths provided for achieving forward first to sixth speed gearings in transmission 100.

To first main shaft 3, there is provided a synchromesh mechanism between 1st speed output gear 14 and 3rd speed output gear 13, which comprises a 1st/3rd speed coupling sleeve 23.

When 1st/3rd speed coupling sleeve 23 is shifted leftward from a neutral position in FIG. 1, 1st speed output gear 14 is fixed to first main shaft 3 by a corresponding dog clutch. Upon this, the engine rotation transmitted to first input shaft 1 from first automatic clutch C1 is transmitted from 1st speed input gear 7 to first main shaft 3 through 1st speed output gear 14 and then to first final drive pinion 11, 50 that a first speed gearing is established in transmission 100.

While, when 1st/3rd speed coupling sleeve 23 is shifted rightward from the neutral position in FIG. 1, 3rd speed output gear 13 is fixed to first main shaft 3 by the dog clutch. Upon this, the engine rotation transmitted to first input shaft 1 from first automatic clutch C1 is transmitted from 3rd/5th speed input gear 6 to first main shaft 3 through 3rd speed output gear 13 and then to first final drive pinion 11, so that a third speed gearing is established in transmission 100.

To first main shaft 3, there is further provided another synchromesh mechanism near 2nd speed output gear 12, which comprises a 2nd speed coupling sleeve 24.

When 2nd speed coupling sleeve 24 is shifted leftward from a neutral position in FIG. 1, 2nd speed output gear 12 is fixed to the first mail shaft 3 by a corresponding dog clutch. Upon this, the engine rotation transmitted to second input shaft 2 from second automatic clutch C2 is transmitted from 2nd/4th speed input gear 10 to first main shaft 3 through 2nd speed output gear 12 and then to first final drive pinion 11, so that a second speed gearing is established in transmission 100.

To second main shaft 4, there is provided a synchromesh mechanism between 4th speed output gear 17 and 6th speed output gear 16, which comprises a 4th/6th speed coupling sleeve 25.

When 4th/6th speed coupling sleeve 25 is shifted leftward from a neutral position in FIG. 1, 4th speed output gear 17 is fixed to second main shaft 4 by a corresponding dog clutch. Upon this, the engine rotation transmitted to 2nd speed input shaft 2 from second automatic clutch C2 is transmitted from 2nd/4th speed input gear 10 to second main shaft 4 through 4th speed output gear 17 and then to second final drive pinion 15, so that a fourth speed gearing is established in transmission 100.

While, when 4th/6th speed coupling sleeve 25 is shifted rightward from the neutral position in FIG. 1, 6th speed output gear 16 is fixed to second main shaft 4 by the dog clutch. Upon this, the engine rotation transmitted to second input shaft 2 from second automatic clutch C2 is transmitted from 6th speed input gear 9 to second main shaft 4 through 6th speed output gear 16 and then to second final drive pinion 15, so that a sixth speed gearing is established in transmission 100.

To second main shaft 4, there is further provided another synchromesh mechanism near 5th speed output gear 18, which comprises a 5th speed coupling sleeve 26.

When 5th speed coupling sleeve 26 is shifted rightward from a neutral position in FIG. 1, 5th speed output gear 18 is fixed to second main shaft 4 by a corresponding dog clutch. Upon this, the engine rotation transmitted to first input shaft 1 from first automatic transmission C1 is transmitted from 3rd/5th speed input gear 6 to second main shaft 4 through 5th speed output gear 18 and then to second final drive pinion 15, so that a fifth speed gearing is established in transmission 100.

In the following, description will be directed to a power transmission path provided for achieving a reverse gearing in transmission 100.

Reverse output gear 19 on second main shaft 4 and reverse input gear 8 on first main shaft 1 are arranged in a common surface, and these gears 19 and 8 are selectively connectable through a reverse idler gear 27. For this selective connection between gears 19 and 8, reverse idler gear 27 is slidable along an idler shaft 28.

That is, when reverse idler gear 27 is shifted rightward in FIG. 1 from a neutral position shown by a solid line to a right position shown by a phantom line, reverse input gear 8 becomes engaged with reverse output gear 19 through the reverse idler gear 27. Upon this, the engine rotation transmitted to 1st input shaft 1 from first automatic clutch C1 is transmitted from reverse input gear 8 to second main shaft 4 through reverse idler gear 27 and reverse output gear 19 and then to second final drive pinion 15, so that a reverse gearing is established in transmission 100.

As is understood from the table of FIG. 2, controlling 1st/3rd speed coupling sleeve 23, 5th speed coupling sleeve 26 and reverse idler gear 27 in the above-mentioned manner is carried out by a first control drum for odd speed gearings, while, controlling 2nd speed coupling sleeve 24 and 4th/6th speed coupling sleeve 25 in the above-mentioned manner is carried out by a second control drum for even speed gearings. That is, by turning the first or second control drum to a controlled position, a desired speed gearing (or reverse gearing) is established by the associated gears.

In the table of FIG. 2, engaged condition of automatic first clutch C1 or automatic second clutch C2 is indicated by a circle, and the position assumed by 1st/3rd speed coupling sleeve 23, 5th speed coupling sleeve 26, reverse idler gear 27, 2nd speed coupling sleeve 24 or 4th/6th speed coupling sleeve 25 is also indicated by a circle. For example, for achieving first speed gearing in the transmission 100, first automatic clutch is engaged, 1st/3rd speed coupling sleeve 23 is controlled to assume 1st speed position, and 5th speed coupling sleeve 26, reverse idler gear 27, 2nd speed coupling sleeve 24 and 4th/6th speed coupling sleeve 25 are all controlled to assume respective neutral positions.

In place of the above-mentioned first and second control drums, other actuators, such as hydraulic type and electric type actuators may be used for actuating sleeves 23, 26, 24 and 25 and gear 27.

In transmission 100 having the above-mentioned construction, under a normal running state wherein transmission 100 assumes a certain speed gearing, both first and second automatic clutches C1 and C2 are kept in their engaged conditions and either one of 1st/3rd speed coupling sleeve 23, 5th speed coupling sleeve 26, reverse idler gear 27, 2nd speed coupling sleeve 24 and 4th/6th speed coupling sleeve 25 is kept at a given power transmitting position. For example, when transmission assumes the third speed gearing, both first and second automatic clutch's C1 and C2 are kept engaged and 1st/3rd speed coupling sleeve 23 is kept in 3rd speed position.

That is, when first main shaft 3 is in an operative condition to actually carry out a power transmission, second main shaft 4 is controlled to be in a neutral condition not to carry out a power transmission. While, when second main shaft 4 is in an operative condition to actually carry out a power transmission, first main shaft 3 is controlled to be in a neutral condition not to carry out a power transmission. Accordingly, even when both first and second automatic clutches C1 and C2 are kept engaged during the power transmission switching between first and second main shafts 3 and 4, no problem takes place.

For controlling first and second automatic clutches C1 and C2, 1st/3rd speed coupling sleeve 23, 5th speed coupling sleeve 26, reverse idler gear 27, 2nd speed coupling sleeve 24 and 4th/6th speed coupling sleeve 25, a control unit 30 including a micro-computer is employed. The computer generally comprises CPU (central processing unit), RAM (random access memory), ROM (read only memory) and input and output interfaces.

In the following, a shift up change from the third speed gearing to the fourth speed gearing will be described as an example with the aid of FIG. 1.

When transmission 100 assumes the third speed gearing, 1st/3rd speed coupling sleeve 23 takes a right operative position, viz., 3rd speed position. Under this condition, the engine rotation transmitted to first input shaft 1 from first automatic clutch C1 is transmitted from 3rd/5th speed input gear 6 to first main shaft 3 through 3rd speed output gear 13 and then to first final drive pinion 11 and to final drive ring gear 20.

In this normal running state wherein transmission 100 assumes the third speed gearing, also second automatic clutch C2 assumes its engaged condition. Accordingly, the engine rotation transmitted to second input shaft 2 can be transmitted from 2nd/4th speed input gear 10 to 2nd speed output gear 12 and 4th speed output gear 17. However, subsequent power transmission from gear 12 or 17 to first main shaft 3 or second main shaft 4 is not permitted because the corresponding coupling sleeve 24 or 25 assumes neutral position. That is, the third speed gearing of transmission 100 is carried out having both first and second automatic clutches C1 and C2 kept in their engaged conditions.

In order to achieve the shift up changing to the fourth speed gearing, second automatic clutch C2 for the fourth speed gearing is released from the engaged condition, and then, 4th/6th speed coupling sleeve 25 is shifted leftward to the 4th speed position.

During this, 4th speed output gear 17 becomes fixed to second main shaft 4 thereby to produce a power transmission path including gear 17 and shaft 4. However, a control is so made that before making the actual fixing of 4th speed output gear 17 to second main shaft 4, the release of second automatic clutch C2 takes place, so that the engine rotation is not transmitted to second input shaft 2 and thus the third speed gearing is still maintained in transmission 100.

Then, second automatic clutch C2 for the fourth speed gearing is brought into engaged condition while gradually releasing first automatic clutch C1 for the third speed gearing. With this clutch switching, the shift up changing from the third speed gearing to the fourth speed gearing is actually carried out, so that the engine rotation transmitted to second input shaft 2 from second automatic clutch C2 is transmitted from 2nd/4th speed input gear 10 to second main shaft 4 through 4th speed output gear 17 and then to second final drive pinion 15.

Then, 1st/3th speed coupling sleeve 23 is shifted leftward from 3rd speed position to neutral position, so that a third speed power transmission path including 3rd speed output gear 13 and first main shaft 3 is brought to neutral condition. Upon sensing this neutral condition, first automatic clutch C1 for the third speed power transmission path is brought into its engaged condition standing by a next speed gearing.

As is described hereinabove, in the normal running state wherein transmission 100 assumes a certain speed gearing, both first and second automatic clutches C1 and C2 are kept engaged. This means that even when the gears of one group assume a neutral condition disabling a power transmission by the group, the corresponding automatic clutch C1 or C2 is kept engaged inputting the engine rotation to the gear group which is at rest. Accordingly, if no measures are taken in the above-mentioned construction of transmission 100, the following undesired phenomenon tends to occur.

That is, when the input section of transmission undergoes a speed change, a so-called gear hit noise is produced due to a back rush phenomenon that would be inevitably produced by mutually engaged gears of the group which is at rest.

For avoiding such gear hit noise, the following measures are employed in the present invention.

That is, as will be described in detail in the following, in the present invention, upon sensing a critical condition to induce a gear hit noise, automatic clutch C1 or C2 that is incorporated with one gear group that is at a rest (viz., neutral condition) is enforcedly brought to a released condition from an engaged condition.

Figure 3:
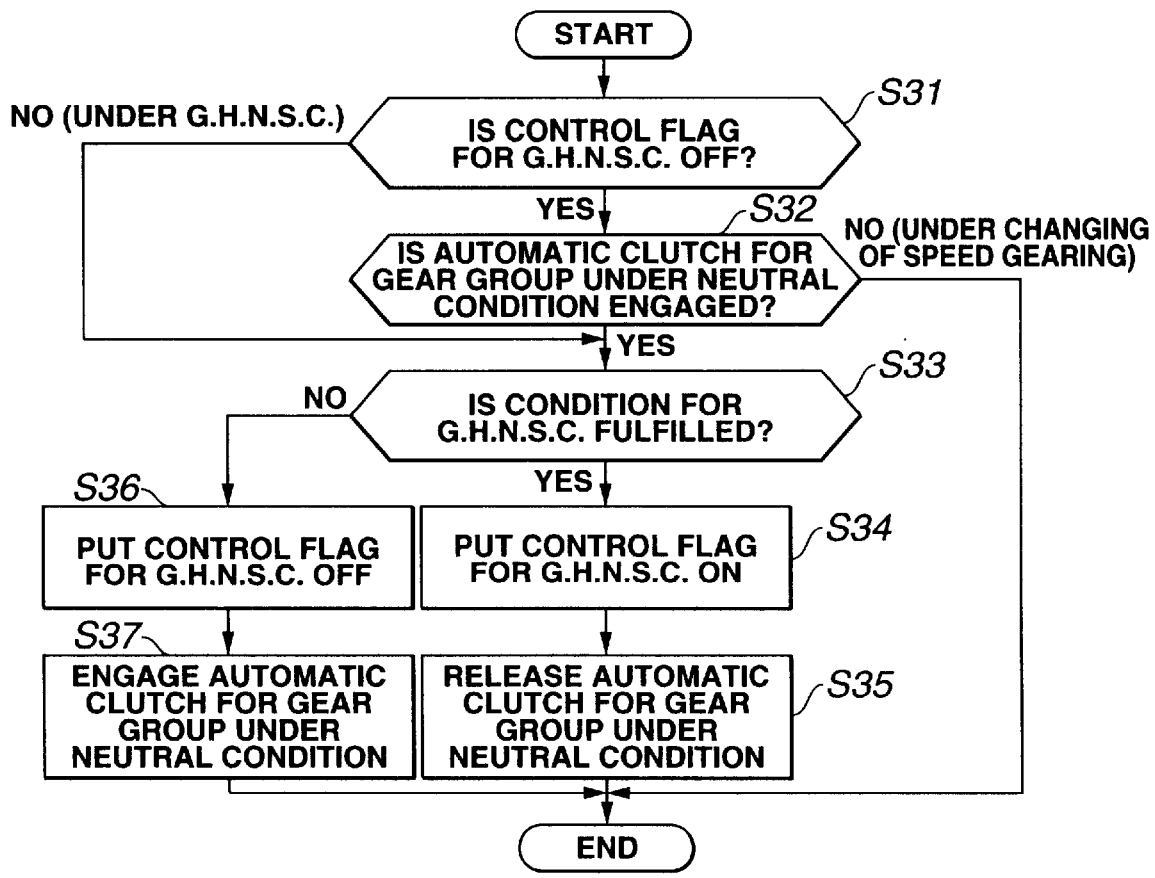
FIG. 3 is a flowchart showing operation steps executed by a control unit for controlling the gear hit noise suppression system.

Operation steps executed by control unit 30 for achieving such control are shown in the flowchart of FIG. 3.

At step S31, judgement is carried out as to whether a gear hit noise suppression control (which is shortened and designated by G.H.N.S.C. in the drawings) has not been carried out yet or is being carried out by checking ON/OFF condition of a corresponding control flag. If YES at step S31, that is, when it is judged that the gear hit noise suppression control has not been carried out yet, the operation step goes to step S32. At this step S32, judgement is carried out as to whether the automatic clutch C1 or C2 incorporated with the gear group under neutral condition is engaged or not. By this judgement, determination is carried out as to whether transmission 100 is under changing of speed gearing or not. If YES at step S32, that is, when it is judged that transmission 100 is not under changing of speed gearing, operation step goes to step S33. At this step S33, judgement is carried out as to whether condition for carrying out the gear hit noise suppression control is fulfilled or not. For this judgement, an engine throttle opening degree TVO detected by a throttle sensor S1 (see FIG. 1) and an engine rotation speed Ne detected by an engine speed sensor S2 may be used. That is, when a rate of change of the throttle opening degree TVO per unit time exceeds a predetermined value, or when a rate of change of engine output torque per unit time, which is estimated from the throttle opening degree TVO or engine rotation speed Ne, exceeds a predetermined value, it is judged that a possibility of producing a gear hit noise arises, that is, condition for carrying out the gear hit noise suppression control is fulfilled. If YES at step S33, that is, when it is judged that condition for carrying out the gear hit noise suppression control is fulfilled, operation flow goes to step S34. At this step 534, a control flag is put ON for showing that the gear hit noise suppression control is under operation. Then, operation flow goes to step S35 to release the automatic clutch C1 or C2 for the gear group that is at rest (viz., under neutral condition).

Due to the released condition of clutch C1 or C2 for the gear group at rest, the engine rotation can not be inputted to the power transmission path of the gear group. Accordingly, undesired gear hit noise, which would be caused by back rush phenomenon of mutually engaged gears of the rest group, is suppressed.

Referring back to the flowchart of FIG. 3, if NO at step S33, that is, when it is judged that condition for carrying out the gear hit noise suppression control is not fulfilled, operation flow goes to step S36. At this step S36, a control flag is put OFF for showing that the gear hit noise suppression control is not under operation. Then, operation flow goes to step S37 to engage the automatic clutch C1 or C2 for the gear group that is at rest (viz., under neutral condition). With this, the gear hit noise suppression control is ended.

If NO at step S31, that is, when it is judged that the gear hit noise suppression control is being carried out, operation flow directly goes to step S33, and thus the gear hit noise suppression control is continued so long as the condition for carrying out the control is kept fulfilled, and when the condition becomes not fulfilled, the gear hit noise suppression control becomes ended through steps S36 and S37.

If NO at step S32, that is, it is judged that the automatic clutch C1 or C2 incorporated with the gear group under neutral condition is not engaged, that is, transmission 100 is under changing of speed gearing, the gear hit noise suppression control is instantly ended. That is, in such case, the suppression control is inhibited so as to avoid interruption of the control to the changing of speed gearing.

As will be understood from the foregoing description, in the present invention, when one gear group assumes a neutral condition bringing about a stand-by state (step S33) for producing undesired gear hit noise, automatic clutch C1 or C2 incorporated with such gear group is released from the engaged condition (step S35). Thus, transmission of engine rotation to such gear group at rest is not allowed and thus undesired gear hit noise, which would be produced by such gear group, is not produced.

For finding or judging the critical condition which may bring about undesired gear hit noise, the time when a rate of change of the throttle opening degree TVO per unit time or a rate of change of engine output torque per unit time exceeds a given value is used. That is, for finding or judging the critical condition, an abnormal change of engine load is employed. Accordingly, the critical condition that may bring about the gear hit noise can be correctly detected, and thus the undesired gear hit noise can be assuredly suppressed.

In case wherein transmission 100 is under changing of speed gearing (NO at step S32), the gear hit noise suppression control for releasing the automatic clutch C1 or C2 incorporated with the gear group at rest is instantly ended. Thus, the changing of speed gearing is not interrupted by such suppression control.

The entire contents of Japanese Patent Application 2001-166194 filed Jun. 1, 2001 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A twin clutch transmission for use with a prime mover, comprising:

a first group of gears which are operable to select one of a first group of speed gearings with the aid of a first selection mechanism;

a second group of gears which are operable to select one of a second group of speed gearings with the aid of a second selection mechanism;

a first automatic clutch which is incorporated with said first group of gears to establish the selected one of said first group of gearings when engaged;

a second automatic clutch which is incorporated with said second group of gears to establish the selected one of said second group of gearings when engaged; and a control unit which controls said first and second selection mechanisms and said first and second automatic clutches, said control unit being configured to carry out:
establishing a condition wherein both said first and second automatic clutches are in their engaged conditions and wherein one of said first and second groups of gears is operated to select a certain speed gearing with the aid of the corresponding selection mechanism while leaving the other of said first and second groups of gears in a neutral condition with the aid of the corresponding selection mechanism; and releasing the engaged condition of the automatic clutch incorporated with the other of said first and second groups of gears when the other of said first and second groups of gears is in a critical condition to induce a gear hit noise.

2. A twin clutch transmission as claimed in claim 1, in which said critical condition is detected by an abnormal change of load applied to said prime mover.

3. A twin clutch transmission as claimed in claim 1, in which said critical condition is detected by an abnormal change of load applied to an internal combustion engine which is said prime mover.

4. A twin clutch transmission as claimed in claim 3, in which detection of said critical condition is carried out by checking the time when a rate of change of throttle opening degree of the engine per unit time exceeds a predetermined value.

5. A twin clutch transmission as claimed in claim 3, in which detection of said critical condition is carried out by checking the time when a rate of change of output torque of the engine per unit time exceeds a predetermined value.

6. A twin clutch transmission as claimed in claim 1, in which said control unit is configured to further carry out:

inhibiting the releasing of the engaged condition of the automatic clutch incorporated with the other of said first and second groups of gears when the transmission is under changing of speed gearing.

7. A twin clutch transmission as claimed in claim 6, in which said control unit is configured to further carry out:

estimating the changing state of speed gearing when the automatic clutch incorporated with the other of said first and second groups of gears is released.

8. A twin clutch transmission as claimed in claim 1, in which said control unit is configured to further carry out:

keeping the engaged condition of the automatic clutch incorporated with the other of said first and second groups of gears when the other of said first and second groups of gears is out of said critical condition.

9. A twin clutch transmission as claimed in claim 1, in which said control unit is configured to further carry out:

keeping the released condition of the automatic clutch incorporated with the other of said first and second groups of gears when said critical condition is kept in the other of said first and second groups of gears.

10. A twin clutch transmission as claimed in claim 9, in which said control unit is configured to further carry out:

re-engaging the automatic clutch incorporated with the other of said first and second groups of gears when the other of said first and second groups of gears becomes out of said critical condition.

11. Method of controlling a twin clutch transmission for use with a prime mover, said transmission including a first group of gears which are operable to select one of a first group of speed gearings with the aid of a first selection mechanism; a second group of gears which are operable to select one of a second group of speed gearings with the aid of a second selection mechanism; a first automatic clutch which is incorporated with said first group of gears to establish the selected one of said first group of gearings when engaged; and a second automatic clutch which is incorporated with said second group of gears to establish the selected one of said second group of gearings when engaged, said method comprising:

establishing a condition wherein both said first and second automatic clutches are in their engaged conditions and wherein one of said first and second groups of gears is operated to select a certain speed gearing with the aid of the corresponding selection mechanism while leaving the other of said first and second groups of gears in a neutral condition with the aid of the corresponding selection mechanism; and releasing the engaged condition of the automatic clutch incorporated with the other of said first and second groups of gears when the other of said first and second groups of gears is in a critical condition to induce a gear hit noise.

* * * * *